United States Patent
Kodati et al.

(10) Patent No.: US 12,391,400 B2
(45) Date of Patent: Aug. 19, 2025

(54) SYSTEMS AND METHODS FOR POWER GENERATION IN AIRCRAFT CABINS

(71) Applicant: B/E AEROSPACE (UK) Limited, Bedfordshire (GB)

(72) Inventors: Sambasiva Kodati, Kaikalur (IN); Ravi B. Chavadi, Hyderabad (IN)

(73) Assignee: B/E AEROSPACE (UK) Limited, Bedfordshire (GB)

( * ) Notice: Subject to any disclaimer, the term of this patent is extended or adjusted under 35 U.S.C. 154(b) by 923 days.

(21) Appl. No.: 17/546,486

(22) Filed: Dec. 9, 2021

(65) Prior Publication Data
US 2023/0068305 A1 Mar. 2, 2023

(30) Foreign Application Priority Data
Sep. 1, 2021 (IN) .............................. 202141039601

(51) Int. Cl.
| | | |
|---|---|---|
| *B64D 41/00* | (2006.01) | |
| *B64C 1/18* | (2006.01) | |
| *H02N 2/18* | (2006.01) | |
| *B64D 11/00* | (2006.01) | |

(52) U.S. Cl.
CPC ................ *B64D 41/00* (2013.01); *B64C 1/18* (2013.01); *H02N 2/186* (2013.01); *B64D 2011/0038* (2013.01)

(58) Field of Classification Search
CPC ............ B64D 41/00; B64D 2011/0038; B64D 11/00; B64D 2221/00; B64C 1/18; H02N 2/186
See application file for complete search history.

(56) References Cited

U.S. PATENT DOCUMENTS

| | | |
|---|---|---|
| 8,736,088 B2 | 5/2014 | Kemball-Cook et al. |
| 9,735,708 B2 | 8/2017 | Mihar |
| 10,205,409 B1 | 2/2019 | Meloche et al. |
| 10,557,460 B2 | 2/2020 | Webster et al. |
| 2018/0134365 A1* | 5/2018 | Knipprath ............... B64C 1/062 |
| 2021/0111645 A1 | 4/2021 | Bykothuru et al. |
| 2022/0302856 A1* | 9/2022 | Daniels .............. H01R 13/6205 |

FOREIGN PATENT DOCUMENTS

| | | |
|---|---|---|
| DE | 102005002370 | 7/2006 |
| DE | 1020191114255 | 12/2020 |
| WO | 2015129393 | 9/2015 |

OTHER PUBLICATIONS

European Patent Office, European Office Action dated Jul. 19, 2024 in Application No. 22193401.1.
European Patent Office, European Search Report dated Jan. 30, 2023 in Application No. 22193401.1.

* cited by examiner

*Primary Examiner* — Emily P Pham
(74) *Attorney, Agent, or Firm* — SNELL & WILMER L.L.P.

(57) ABSTRACT

A floor module for a power generation system may comprise: a housing including a flexible top plate; a plurality of generator assemblies disposed within the housing, each generator in the plurality of generator assemblies comprising: a moveable portion disposed adjacent to the flexible top plate, the moveable portion including a shaft extending away from the flexible top late; and a piezoelectric transducer aligned with the shaft, the piezoelectric transducer configured to compress in response to the moveable portion translating toward the piezoelectric transducer from a force on the flexible top plate.

8 Claims, 9 Drawing Sheets

SYSTEMS AND METHODS FOR POWER GENERATION IN AIRCRAFT CABINS

CROSS-REFERENCE TO RELATED APPLICATIONS

This application claims priority to, and the benefit of, Indian Provisional Patent Application No. 202141039601, having DAS code 60ED, filed Sep. 1, 2021 and titled "SYSTEMS AND METHODS FOR POWER GENERATION IN AIRCRAFT CABINS," which application is incorporated herein by reference in its entirety for all purposes.

FILED

The present disclosure relates generally to systems and methods for power generation and, more particularly, to systems and methods for power generation in an aircraft cabin.

BACKGROUND

Passengers and crew walk about an aircraft cabin throughout a respective aircraft flight. All the energy from walking about the aircraft cabin is wasted and not utilized by systems within an aircraft. Various systems in an aircraft cabin utilize electricity, such as lighting systems, electronic charging systems, or the like.

SUMMARY

A floor module for a power generation system is disclosed herein. The floor module may comprise: a housing including a flexible top plate; a plurality of generator assemblies disposed within the housing, each generator in the plurality of generator assemblies comprising: a moveable portion disposed adjacent to the flexible top plate, the moveable portion including a shaft extending away from the flexible top plate; and a piezoelectric transducer aligned with the shaft, the piezoelectric transducer configured to compress in response to the moveable portion translating toward the piezoelectric transducer from a force on the flexible top plate.

In various embodiments, each generator assembly in the plurality of generator assemblies further comprises a fixed base, the piezoelectric transducer disposed within the fixed base. Each generator assembly in the plurality of generator assemblies may further comprise a spring disposed between the fixed based and the moveable portion. The spring may be configured to bias the moveable portion away from the piezoelectric transducer in response to a force being removed from the top plate. The floor module may further comprise a wiring harness, the wiring harness electrically coupling the piezoelectric transducer for each generator assembly in the plurality of generator assemblies together. The housing may further comprise a base plate, and the flexible top plate may be removable and is coupled to the base plate. The plurality of generator assemblies may be disposed between the base plate and the flexible top plate. A set of generator assemblies in the plurality of generator assemblies may be configured to compress in response to a pressure disposed on an area of the flexible top plate.

A power generation system is disclosed herein. The power generation system may comprise: an electrical device; and a floor assembly including a floor module, the floor module comprising: a generator assembly including a moveable portion, a generator, and a fixed base, the generator in electrical communication with the electrical device, the moveable portion configured to translate relative to the fixed base, the generator configured to convert mechanical energy from the moveable portion to electrical energy, the electrical energy supplied to the electrical device.

In various embodiments, the electrical device may be an electrical storage device, the electrical storage device configured to supply power to on-board electronics. The electrical device may comprise a plurality of light units spaced apart adjacent to an aisle defined by the floor assembly. The aisle may be in an aircraft. The power generation system may further comprise a plurality of the generator assembly. The power generation system may further comprise a rectifier disposed electrically between the electrical device and the plurality of generator assemblies. The generator may be a piezoelectric transducer.

An aircraft is disclosed herein. The aircraft may comprise: an electrical device; a floor assembly at least partially defining an aisle; and a floor module having a plurality of generator assemblies disposed therein, the plurality of generator assemblies configured to convert mechanical energy from a passenger walking on the floor module to electrical energy, the electrical energy supplied to the electrical device.

In various embodiments, the electrical device is a plurality of light units disposed adjacent to the aisle. The electrical device may be an electrical storage device configured to store and supply the electrical energy to electronics on-board the aircraft. Each generator assembly in the plurality of generator assemblies may comprise a moveable portion, the moveable portion configured to create the mechanical energy. The aircraft may further comprise a plurality of the floor module.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein are systems and methods for power generation within an aircraft cabin. The system disclosed herein may utilize various generators, such as a piezoelectric transducer disposed within a floor assembly of an aircraft cabin. Although described herein with respect to piezoelectric transducers, the present disclosure is not limited in this regard. For example, a generator configured to convert rotational motion to electrical energy is within the scope of this disclosure. In various embodiments, in response to any of the piezoelectric transducers being compress (e.g., in response to a passenger stepping on the floor assembly), electrical energy may be generated, stored, and/or utilized as described further herein. In various embodiments, the system may include a power generation unit configured to control dispersion of electrical energy generated from the floor assembly as described further herein.

Figure 1:
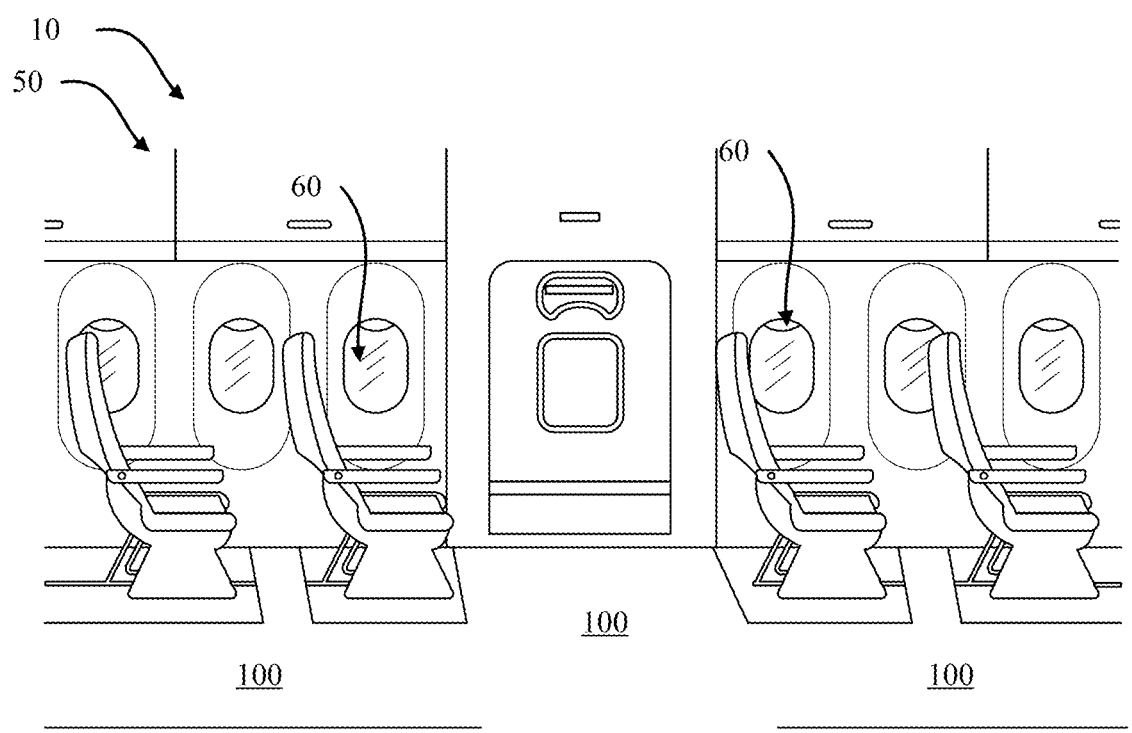
FIG. 1 illustrates a side view from within an aircraft cabin, in accordance with various embodiments.

With reference to FIG. 1, a cabin 50 of an aircraft 10 is shown, in accordance with various embodiments. The aircraft 10 may be any aircraft such as an airplane, a helicopter, or any other aircraft. The aircraft 10 may include an aisle 100 to facilitate maneuvering of passengers throughout the cabin 50. The aisle 100 may be disposed between rows of seats 60, between columns of seats, at an entrance to the aircraft 10, or the like. During boarding and de-boarding, passengers line up and walk along the aisle 100, energy which is typically lost and not re-purposed. Although aisle 100 is illustrated as being between columns of seats and in an exit row, the present disclosure is not limited in this regard. For example, aisle 100 may extend between adjacent rows of seats and still be within the scope of this disclosure.

Figure 2:
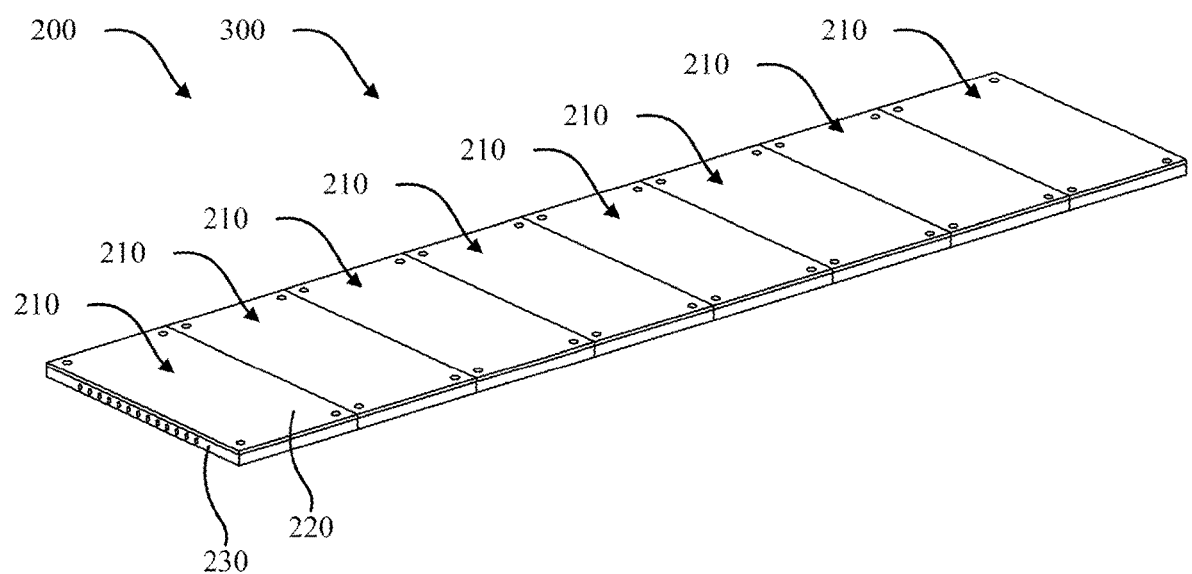
FIG. 2 illustrates a floor assembly with a power generation system, in accordance with various embodiments.

Referring now to FIG. 2 a floor assembly 200 for use in an aisle 100 of a cabin 50 of an aircraft 10 from FIG. 1 is illustrated, in accordance with various embodiments. Although described herein with respect to the aisle 100 of the cabin 50, the present disclosure is not limited in this regard. For example, the floor assembly 200 may be utilized in various other applications, such as movie theaters, malls, offices, etc. In various embodiments, the floor assembly 200 comprises a plurality of floor modules 210. The plurality of floor modules 210 may be modular. In this regard, each floor module in the plurality of floor modules 210 may comprise be shaped and configured to be aligned with adjacent floor modules in the plurality of floor modules 210 and be adaptable to various floor configurations, such as aisle 100 from FIG. 1, in accordance with various embodiments.

Each floor module in the plurality of floor modules 210 may comprise a housing. For example, the floor module 220 comprises a housing 222 as described further herein. The housing 230 may be configured to house a portion of a power generation system 300, in accordance with various embodiments. In this regard, each housing 230 may be configured to house a plurality of generator assemblies. Each generator assembly in the plurality of generator assemblies is configured to convert a mechanical force (e.g., from compression of the piezoelectric generator in response to a passenger stepping on the piezoelectric generator) into electrical energy as described further herein. In various embodiments, the electrical energy may be stored, used to power lights proximate the aisle 100 from FIG. 1, or the like.

In various embodiments, the plurality of generator assemblies from each floor module in the plurality of floor modules 210 may be electrically coupled (i.e., in series and/or parallel) to adjacent floor modules. In various embodiments, the plurality of floor modules 210 are electrically coupled to an energy storage device (e.g., a supercapacitor, a battery, or the like), or directly to an electrically powered device, such as aisle lights.

Figure 3:
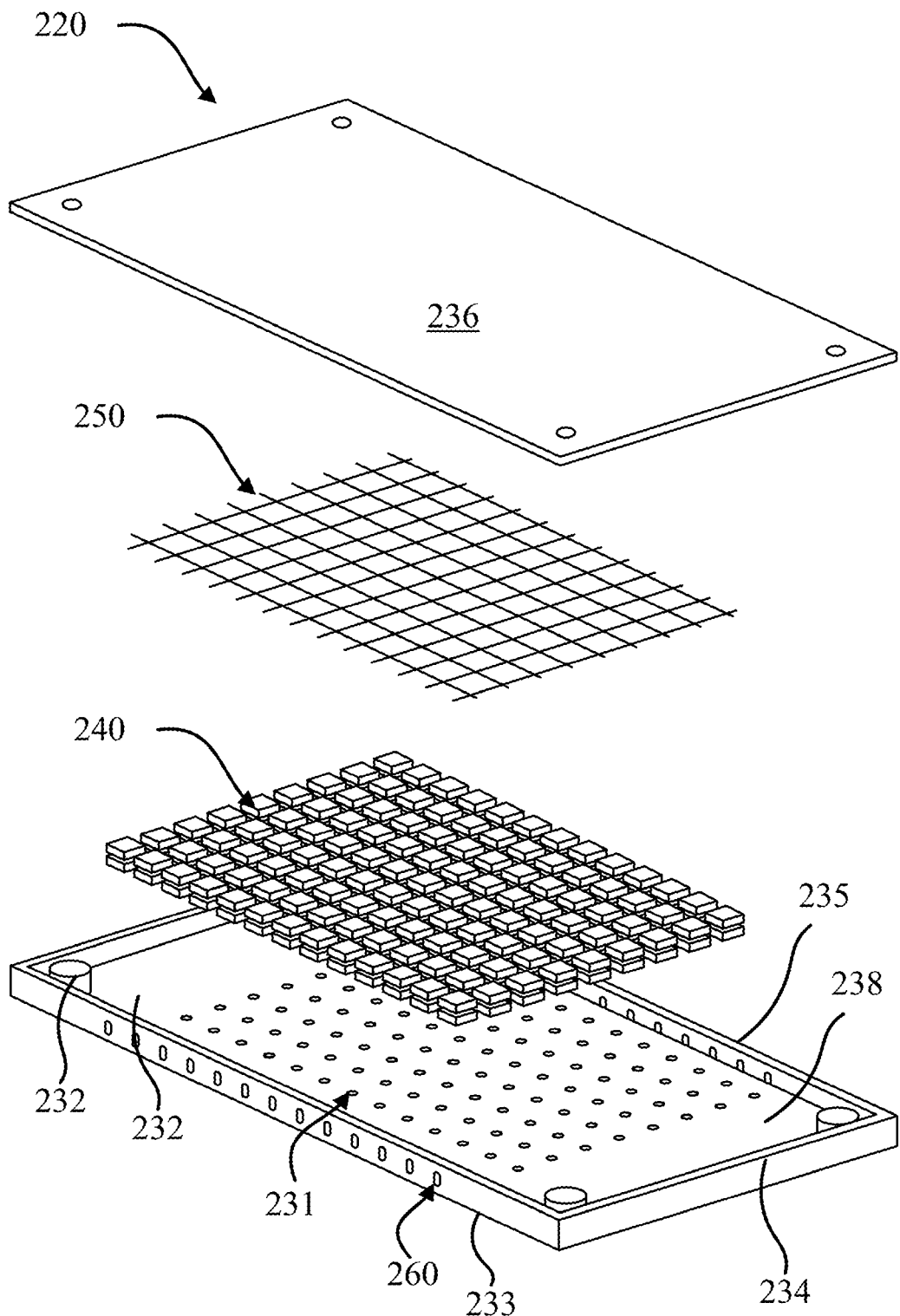
FIG. 3 illustrates a floor module for a floor assembly, in accordance with various embodiments.

Referring now to FIG. 3, an exploded view of a floor module 220 for use in a power generation system 300 from FIG. 2 is illustrated, in accordance with various embodiments. The floor module 220 comprises the housing 230 from FIG. 2. The housing 230 may comprise a base plate 232, sidewalls 234, and a top plate 236. The base plate 232 and the sidewalls 234 may be a monolithic component (i.e., formed from a single piece of material). However, the present disclosure is not limited in this regard. For example, the base plate 232 and the sidewalls 234 may be formed of separate materials and coupled together, in accordance with various embodiments. The top plate 236 may removably coupled to the base plate (e.g., via fasteners or the like). In various embodiments, the base plate 232 and the sidewalls 234 define a recess 238 configured to receive a plurality of generator assemblies 240. In various embodiments, the top plate 236 may comprise a flexible sheet. In this regard, the top plate may flex, or bend, in response to a pressure being applied away from various mounting locations 239.

In various embodiments, the generator assemblies 240 may be aligned in rows and columns. Although illustrated as being aligned in rows and columns, the plurality of generator assemblies 240 are not limited in this regard. For example, the generator assemblies 240 may be arranged and configured in various orientations based on a configuration of an aisle 100 from FIG. 1 utilizing the power generation system 300 from FIG. 2. In various embodiments, the plurality of generator assemblies 240 are disposed between the base plate 232 and the top plate 236. In this regard, in response to the top plate 236 being stepped on, the top plate 236 may deform toward the base plate 232, compressing a set of generator assemblies in the plurality of generator assemblies 240. Thus, mechanical energy from the step may be converted to electrical energy by the set of generator assemblies in the plurality of generator assemblies 240.

In various embodiments, the floor module 220 further comprises a wiring harness 250. The wiring harness 250 may be configured to electrically couple a generator of each generator assembly in the plurality of generator assemblies 240 together. In this regard, the wiring harness 250 may be configured to couple each generator in series and/or parallel, in accordance with various embodiments. The wiring harness 250 may be configured to be electrically coupled to an electrical load (e.g., a light), an energy storage device (e.g., a battery, a supercapacitor, etc.), or a combination of the two, in accordance with various embodiments.

In various embodiments, a first sidewall 233 and a second sidewall 235 in the sidewalls may comprise a plurality of apertures 260. The first sidewall 233 may be disposed opposite the second sidewall 235. Although illustrated as the first sidewall 233 and the second sidewall 235 being opposite, the present disclosure is not limited in this regard. For example, the first sidewall 233 and the second sidewall 235 may be adjacent sidewalls, in accordance with various embodiments.

The plurality of apertures 260 disposed in sidewalls 233, 235 may be configured to receive a portion of the wiring harness 250. In this regard, the wiring harness 250 may be coupled to adjacent floor modules in the plurality of floor modules 210 from FIG. 2 and/or routed to the electrical load and/or energy storage device, as described further herein.

In various embodiments, the base plate 232 comprises a plurality of recesses 231. The plurality of recesses 231 may be configured as mounting locations for generators as described further herein. In this regard, a generator may be configured to be disposed within the plurality of recesses 231. Although described herein as being recesses, the present disclosure is not limited in this regard. For example, the mounting locations for the generator may be raised above a surface of the base plate 232 in accordance with various embodiments. Additionally, each generator may be mounted directly within a respective generator assembly in the plurality of generator assemblies, in accordance with various embodiments.

Figure 4:
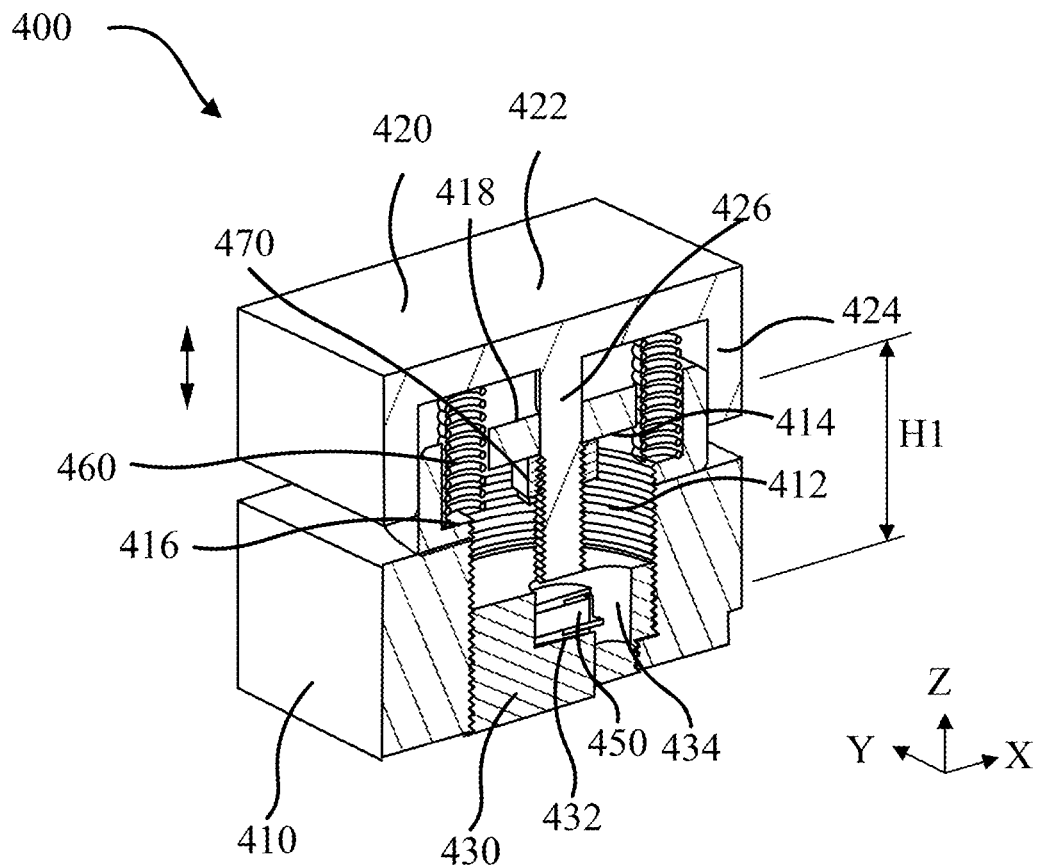
FIG. 4 illustrates a perspective cross-sectional view of a generator assembly of a floor module, in accordance with various embodiments.

Referring now to FIG. 4, a perspective cross-sectional view of a generator assembly 400 in the plurality of generator assemblies 240 from FIG. 3, in accordance with various embodiments. In various embodiments, the generator assembly 400 comprises a fixed base 410 and a moveable portion 420. In various embodiments, the fixed base 410 may be a part of the base plate 232 from FIG. 3 or mounted to the base plate 232. The present disclosure is not limited in this regard.

Figure 10:
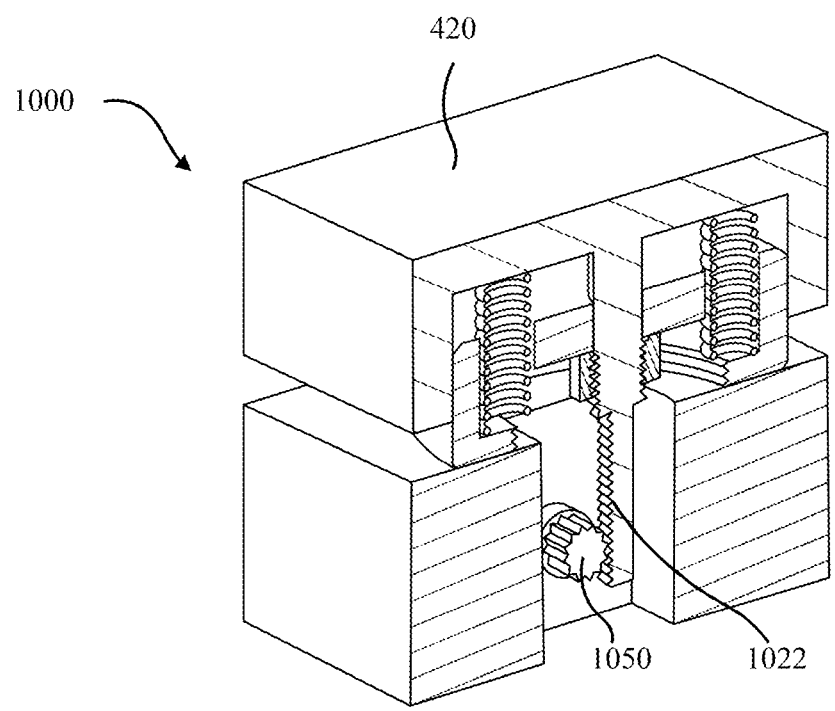
FIG. 10 illustrates a perspective cross-sectional view of a generator assembly, in accordance with various embodiments.

In various embodiments, the generator assembly 400 comprises a height adjuster 430. The height adjuster 430 may be disposed in a recess 412 of the fixed base 410. In this regard, the height adjuster 430 may be configured to adjust a height H1 of a piezoelectric mating surface 432 of the height adjuster 430 relative to an axial surface 414 defined by the recess 412. Additionally, the height adjuster 430 may facilitate assembly of the generator assembly 400. In various embodiments, the height adjuster further comprises a slot 434 configured to house a piezoelectric transducer 450 and any associated wiring from the wiring harness 250 from FIG. 3. Although illustrated as having the piezoelectric transducer 440, the present disclosure is not limited in this regard. For example, with brief reference to FIG. 10, a generator 1050 of a generator assembly 400 may be configured to rotate in response to the moveable portion 420 translating (e.g., via engagement with a shaft 1022, in accordance with various embodiments.

In various embodiments, the moveable portion 420 comprises a base 422, sidewalls 424 extending in a vertical direction (i.e., Z-direction) from a perimeter of the base 422 towards the fixed base 410 of the generator assembly 400. In various embodiments, the moveable portion further comprises a shaft 426 extending from the base 422 of the moveable portion toward the height adjuster 430. The shaft 426 is aligned with the piezoelectric transducer 450.

In various embodiments, the generator assembly 400 further comprises a spring 460 disposed between the base 422 of the moveable portion and a recess surface 416 of the fixed base 410. In various embodiments, the spring 460 is a compression spring. In various embodiments, a plurality of the spring 460 are disposed circumferentially around a centerline defined by the shaft 426. Although illustrated in this manner, the present disclosure is not limited in this regard. For example, a single wave style spring may be disposed around the shaft 426 and be within the scope of this disclosure.

In various embodiments, the generator assembly further comprises a nut 470. The nut 470 may be coupled to the shaft 426 of the moveable portion 420. In this regard, the nut 470 may be configured to adjust a gap between the base 422 of the moveable portion and a top surface 418 of the fixed base 410. In this regard, the nut 470 may further be configured to adjust an initial compression of the spring 460 upon assembly. In various embodiments, the spring 460 may be in a neutral state in response to assembly. In various embodiments, the spring 460 may be slightly compressed in response to assembly. The present disclosure is not limited in this regard.

Figure 5:
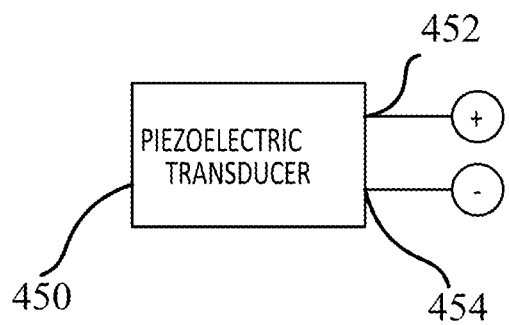
FIG. 5 illustrates a schematic view of a piezoelectric transducer, in accordance with various embodiments.

In various embodiments, the in response to a top surface of base 422 of the moveable portion 420 experiencing a pressure in a downward direction (i.e., −Z direction), the shaft 426 moves toward the piezoelectric transducer 450, contacting and creating a force on the piezoelectric transducer 450, and compressing the piezoelectric transducer 450. In response to the piezoelectric transducer 450 being compressed from the force, the piezoelectric transducer 450 converts the mechanical energy to electrical energy. With reference now to FIG. 5, the piezoelectric transducer 450 comprises 452 and a negative terminal 454. In this regard, an electrical wire from the wiring harness 250 from FIG. 3 may be routed and coupled to the positive terminal 452 and a second electrical wire from the wiring harness 250 may be routed and coupled to the negative terminal. Thus, the piezoelectric transducer 450 may be in an electrical circuit and coupled to an energy storage device (e.g., a supercapacitor, a battery, etc.) and/or an electrical load (e.g., a light).

Figure 6A:
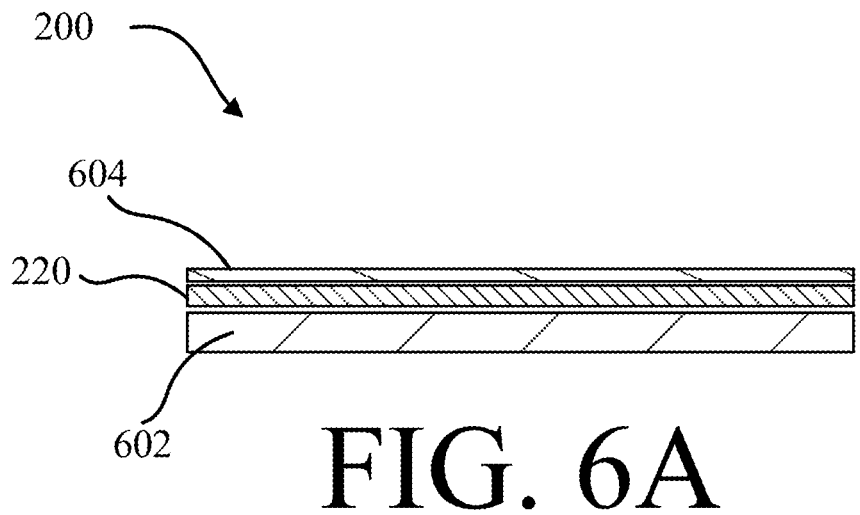
FIG. 6A illustrates a cross-sectional view of a cabin floor in an aircraft, in accordance with various embodiments.

Referring now to FIG. 6A, a cross sectional view of the floor assembly 200 with the floor module 220 installed and forming an aisle 100 of an aircraft 10 from FIG. 1 is illustrated, in accordance with various embodiments. In various embodiments, each floor module in the plurality of floor modules 210 of the floor assembly 200 from FIG. 2 (e.g., floor module 220) may be disposed vertically between a carpet 604 and a floor panel 602. In this regard, the carpet 604 may flex with the top plate 236 of floor module 220 and compress each moveable portion 420 of each generator assembly 400 from FIG. 4 that is in an area of a step (e.g., a ball of a foot or the like). For example, with reference now to FIG. 6B, pressure from a person's foot 610 may compress an area of a top plate 236, which compresses a set of generator assemblies (e.g., generator assembly 612 and generator assembly 614), while surrounding generator assemblies (e.g., generator assembly 616 and generator assembly 618 may remain static. In response to the set of generator assemblies (e.g., generator assembly 612 and generator assembly 614) being compressed from the person's foot, a voltage output may be generated by a piezoelectric transducer 450 from FIG. 4 for each generator assembly being compressed (e.g., generator assembly 612 and 614). The voltage output may correspond to a displacement of a respective piezoelectric transducer 450 from FIG. 4 from an uncompressed state to the compressed state. Thus, more compression may produce a greater voltage output.

Figure 6B:
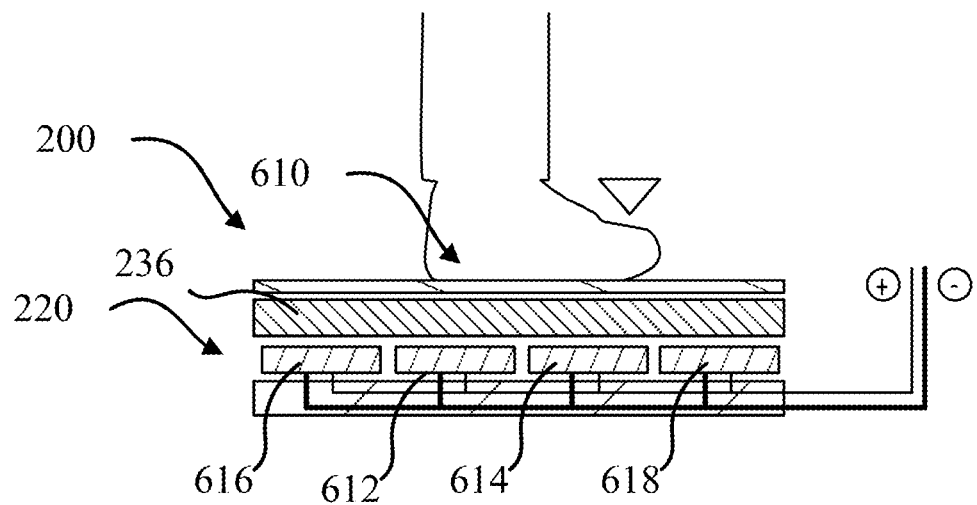
FIG. 6B illustrates a cross-sectional view of a cabin floor in an aircraft, in accordance with various embodiments.

With continued reference to FIG. 6B, a cross-sectional view of a portion of the floor assembly 200 with the power generation system 300 from FIG. 2 in use is illustrated, in accordance with various embodiments. In various embodiments, a negative terminal of each piezoelectric transducer is electrically coupled to a negative terminal of adjacent piezoelectric transducer within a floor module 220. In this regard, all piezoelectric transducers in a floor module 220 may be coupled in parallel, in accordance with various embodiments. In various embodiments, all piezoelectric transducers in a floor module 220 may be coupled in series. The present disclosure is not limited in this regard.

Figure 7:
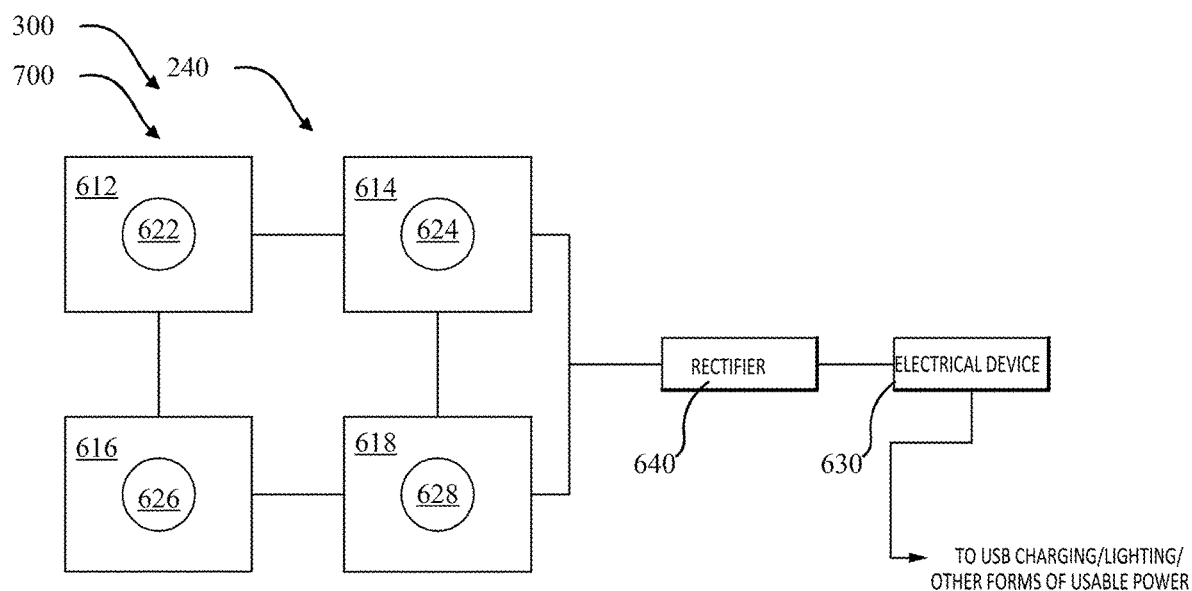
FIG. 7 illustrates a schematic view of a power generation system, in accordance with various embodiments.

Referring now to FIG. 7, a schematic view of a portion of an electrical system 700 for a power generation system 300 from FIG. 2 is illustrated, in accordance with various embodiments. The power generation system 300 comprises the plurality of generator assemblies 240 (e.g., generator assemblies 612, 614, 616, 618). Each generator assembly comprises a piezoelectric transducer in accordance with the piezoelectric transducer 450 from FIG. 4 (e.g., piezoelectric transducers 622, 624, 626, 628). The piezoelectric transducers 622, 624, 626, 628 may be electrically coupled together in series, in parallel, or a combination of the two. The piezoelectric transducers 622, 624, 626, 628 are all electrically coupled to an electrical device 630. The electrical device 630 may be an electrical load (e.g., an electrically powered light), an energy storage device (e.g., a battery or a supercapacitor.

In various embodiments, the electrical system 700 further comprises a rectifier 640 disposed between the electrical device 630 and the plurality of generator assemblies 240. In this regard, the rectifier 640 is configured to convert an oscillating alternating current (AC) from the piezoelectric transducers 622, 624, 626, 628, to a direct current (DC) for use in the electrical device 630 as described further herein.

When the electrical device 630 is an electrical load, the power generated from the piezoelectric transducers 622, 624, 626, 628 may be utilized immediately to power the electrical load (e.g., to light an aisle during an emergency event, a boarding event, or the like. In various embodiments, when the electrical device 630 is an energy storage device, the power generated from the piezoelectric transducers 622, 624, 626, 628 may be stored and utilized later (e.g., for charging stations, lighting systems, or other forms of usable power in an aircraft). In this regard, the power generation system 300 disclosed herein may supplement a power supply provided on an aircraft, reducing the power supply, in accordance with various embodiments.

Figure 8:
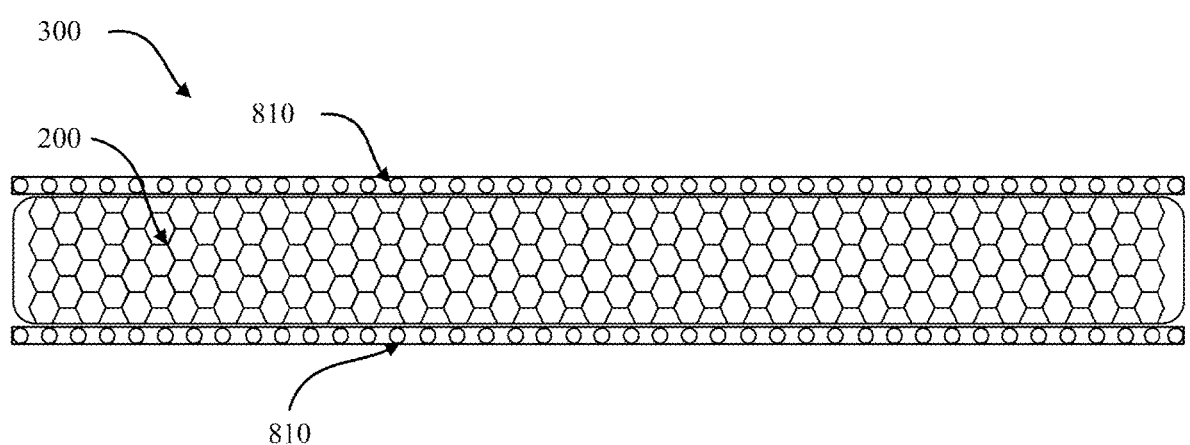
FIG. 8 illustrates a plan view of an aisle in an aircraft, in accordance with various embodiments.

Referring now to FIG. 8, a plan view of a portion of an aisle 800 using a floor assembly 200 from FIG. 2 is illustrated, in accordance with various embodiments. In various embodiments, the aisle comprises a plurality of light units 810. The plurality of light units 810 may be disposed on a first lateral side and a second lateral side of the aisle 800.

In various embodiments, the light units 810 are configured to be powered by the power generation system 300 from FIGS. 2 and 7 disclosed herein. In this regard, in response to a piezoelectric transducer (e.g., piezoelectric transducers 622, 624, 626, 628) being compressed, a set of light units in the plurality of light units 810 may be electrically powered and illuminated. Any number of configurations of coupling the piezoelectric transducers to the light units in the plurality of light units 810 may be contemplated by one skilled in the art. The present disclosure is not limited in this regard.

Figure 9:
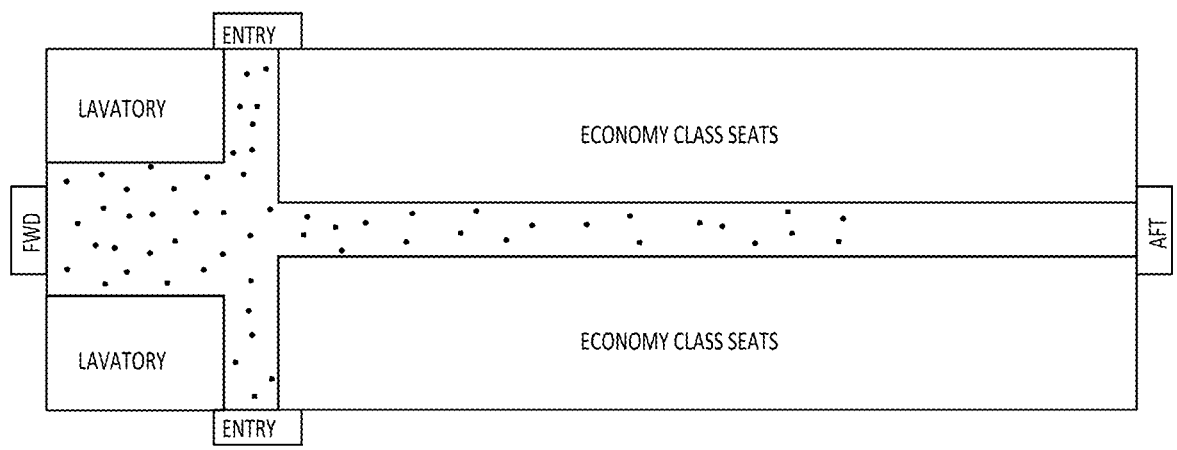
FIG. 9 illustrates a plan view of an aircraft cabin, in accordance with various embodiments.

In various embodiments, some areas of an aircraft cabin 50 from FIG. 1 may provide a greater power benefit from utilizing the power generation system 300 from FIG. 7. For example, as illustrated in FIG. 9, an aisle portion that is proximate various lavatories may experience greater foot traffic relative to an aft portion of an aisle. In this regard, the aisle portion proximate the lavatories may provide greater power generation relative to the aft portion of the aisle, in accordance with various embodiments. Thus, installing the floor assembly 200 from FIG. 2 may be prioritized in high foot traffic areas, in accordance with various embodiments.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A floor module for a power generation system, the floor module comprising:
    a housing including a flexible top plate;
    a plurality of generator assemblies disposed within the housing, each generator in the plurality of generator assemblies comprising:
    a moveable portion disposed adjacent to the flexible top plate, the moveable portion including a shaft extending away from the flexible top plate; and
    a piezoelectric transducer aligned with the shaft, the piezoelectric transducer configured to compress in response to the moveable portion translating toward the piezoelectric transducer from a force on the flexible top plate.

2. The floor module of claim 1, wherein each generator assembly in the plurality of generator assemblies further comprises a fixed base, the piezoelectric transducer disposed within the fixed base.

3. The floor module of claim 1, wherein each generator assembly in the plurality of generator assemblies further comprises a spring disposed between the fixed based and the moveable portion.

4. The floor module of claim 3, wherein the spring is configured to bias the moveable portion away from the piezoelectric transducer.

5. The floor module of claim 1, further comprising a wiring harness, the wiring harness electrically coupling the piezoelectric transducer for each generator assembly in the plurality of generator assemblies together.

6. The floor module of claim 1, wherein the housing further comprises a base plate, and wherein the flexible top plate is removable and is coupled to the base plate.

7. The floor module of claim 6, wherein the plurality of generator assemblies is disposed between the base plate and the flexible top plate.

8. The floor module of claim 1, wherein a set of generator assemblies in the plurality of generator assemblies are configured to compress in response to a pressure disposed on an area of the flexible top plate.

* * * * *